J. EDSON.
Elastic Shackles for Blocks.
No. 154,381. Patented Aug. 25, 1874.
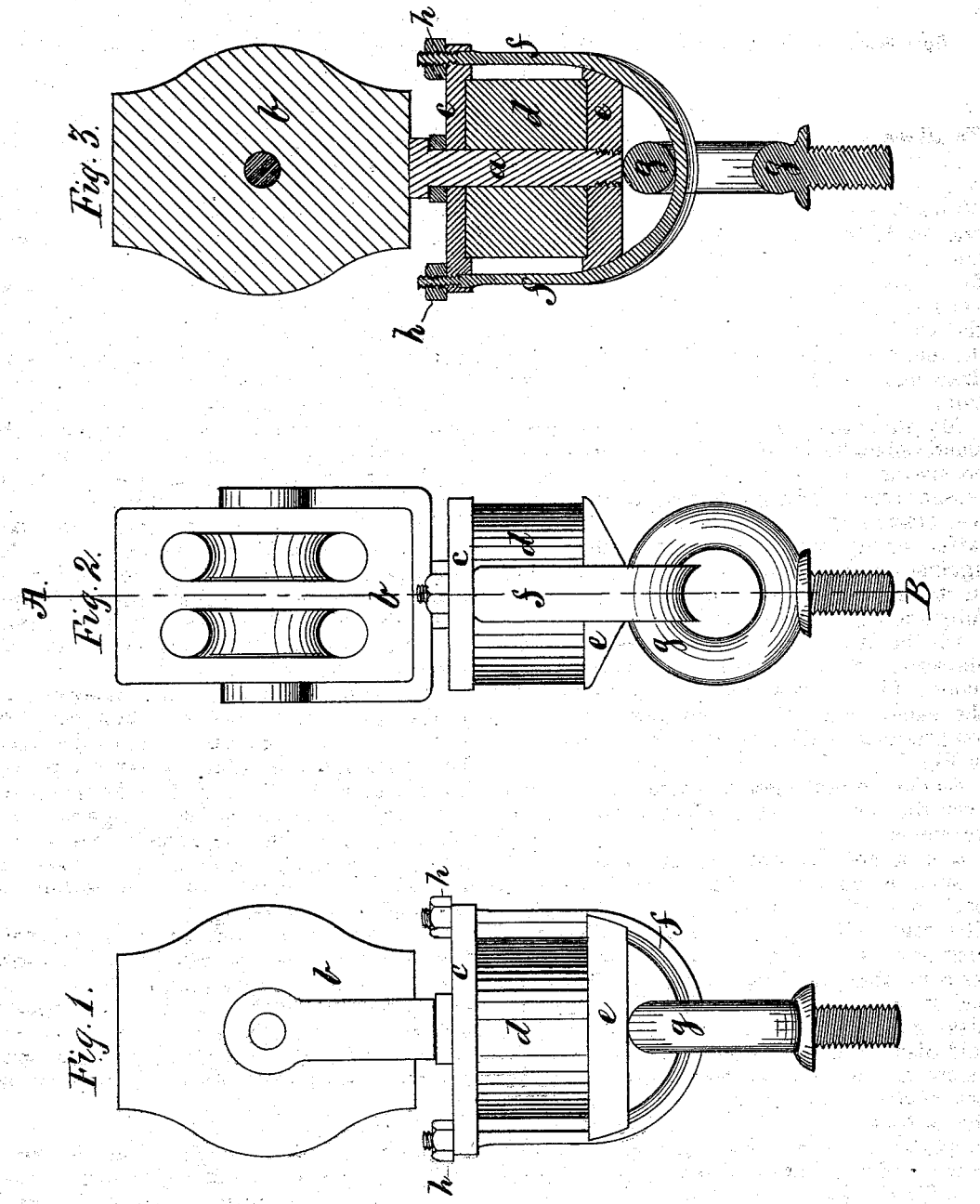
Witnesses:
George E. Phelps.
J. G. Gardner.
Inventor:
Jacob Edson
by Alban Andren, atty

UNITED STATES PATENT OFFICE.

JACOB EDSON, OF BOSTON, MASSACHUSETTS.

IMPROVEMENT IN ELASTIC SHACKLES FOR BLOCKS.

Specification forming part of Letters Patent No. 154,381, dated August 25, 1874; application filed February 2, 1874.

*To all whom it may concern:*

Be it known that I, JACOB EDSON, of Boston, in the county of Suffolk and State of Massachusetts, have invented certain new and useful Improvements in Elastic Shackles; and I do hereby declare the following to be a full, clear, and exact description of the invention, such as will enable others skilled in the art to which it pertains to make and use it, reference being had to the accompanying drawings, which form part of this specification.

My invention relates to improvements in elastic shackles for blocks, ropes, chains, &c., consisting in the combination of an elastic washer and an adjustable yoke, provided with one stationary and one adjustable disk, the latter being forced by the elastic washer against a ring or staple so as to keep the block in its required position, as will now be more fully shown and described.

On the drawings, Figure 1 represents a side elevation of my invention as applied to a block; Fig. 2 represents an end elevation of the same; and Fig. 3 represents a central longitudinal section on the line A B, shown in Fig. 2.

Similar letters refer to similar parts wherever they occur on the different parts of the drawings.

$a$ is a bolt, secured in its upper end in a suitable manner to the block $b$, or other part to which my invention may be applied. The said bolt $a$ projects loosely through a disk or plate, $c$, and an elastic washer, $d$, or its equivalent, as shown in Fig. 3. The lower end of the bolt $a$ is screwed into a movable disk or plate, $e$, or it may project through the said disk $e$ and have a head riveted or secured below, as may be desirable. Suitable recesses are made on the inside of disks $c$ and $e$ for the purpose of letting the elastic washer $d$ rest therein, and to prevent said elastic washer from spreading outward when compressed by a pulling-strain on the bolt $a$. A yoke, $f$, serves as a guide for the movable washer or disk $e$, and for a connection to the ring, $g$, or chain, or other part for which the shackle may be used. The upper ends of the yoke $f$ project through holes made in the plate or disk $c$, and are provided with nuts $h\ h$, by means of which the said yoke $f$ is firmly secured to the disk $c$. The lower end of the bolt $a$ is forced, by the elastic washer $d$, against the upper end of the ring $g$, or its equivalent, as soon as the pulling-strain on the bolt $a$ is relieved, and the shackle is therefore held in its proper position owing to the great friction between the lower end of the bolt $a$ and the upper end of the ring $g$.

When an elastic shackle is used for blocks on vessels, whether such blocks are attached to the mast, booms, or the deck, it is very convenient to have such blocks remaining in their working positions, and for this reason I have constructed my elastic shackle in such a manner that the lower end of the bolt $a$ shall be forced against the upper end of the ring $g$, by the force of the elastic washer $d$. The projecting upper ends of the yoke $f$ prevent the block $b$ from turning with the bolt $a$, more than about a quarter of a revolution, by which arrangement the bolt $a$ is prevented from unscrewing from the movable washer or disk $e$; they also serve, with the nuts $h\ h$, to renew the gripe upon the ring $g$ when it has been worn away by use.

The great objections to elastic blocks, heretofore made and used in connection with shackles, have been that, owing to their peculiar construction and their great length, they have been impractical, as they did not permit the blocks to come as close together as is often required. This objection I overcome by making my elastic shackle very short, and located very close up to the block, as fully represented in the drawings.

The ordinary way of using a spring below the block involves a shackle below the spring, which occupies considerable room and allows the block to shake about unnecessarily, whereas, in my invention, the combined shackle and spring occupy a very small space, besides holding the block in its working position.

I claim—

The combination of the block $b$, bolt $a$, plates $c\ e$, elastic medium $d$, yoke or shackle $f$, and the ring $g$, substantially as and for the purpose set forth and described.

In testimony that I claim the foregoing, I have hereunto set my hand this 28th day of January, 1874.

JACOB EDSON.

Witnesses:
ALBAN ANDRÉN,
GEORGE E. PHELPS.